United States Patent [19]

Cigna et al.

[11] 4,404,293
[45] Sep. 13, 1983

[54] SELF-EXTINGUISHING EXPANDABLE POLYSTYRENE PARTICLES HAVING AN IMPROVED PROCESSABILITY

[75] Inventors: Giuseppe Cigna; Paolo Catarsi; Maria C. Mussatto; Fabrizio Vivaldini, all of Mantova; Stefano Campolmi, Novara, all of Italy

[73] Assignee: Montedison S.p.A., Milan, Italy

[21] Appl. No.: 393,547

[22] Filed: Jun. 30, 1982

[30] Foreign Application Priority Data

Jul. 3, 1981 [IT] Italy .............................. 22731 A/81

[51] Int. Cl.³ .............................................. C08J 9/18

[52] U.S. Cl. ........................................ 521/56; 521/57; 521/58; 521/90; 521/146; 521/907; 524/100

[58] Field of Search ................... 524/100; 521/56, 57, 521/90, 146, 907

[56] References Cited

U.S. PATENT DOCUMENTS 4,192,922 3/1980 Mixich et al. .................... 521/90

Primary Examiner—Morton Foelak

[57] ABSTRACT

Self-extinguishing expandable polystyrene particles containing an expanding agent, a self-extinguishing organic halogen-containing compound and a 2,4,6-triamino-1,3,5-triazine derivative.

6 Claims, No Drawings

SELF-EXTINGUISHING EXPANDABLE POLYSTYRENE PARTICLES HAVING AN IMPROVED PROCESSABILITY

FIELD OF THE INVENTION

This invention relates to self-extinguishing expandable polystyrene particles having an improved processability.

More particularly, the present invention relates to self-extinguishing expandable polystyrene particles, useful to manufacture molded bodies, especially block of large dimensions, having a high sintering degree, a uniform cellular structure with closed and non-perforated cell walls, a low shrinkage, and with a relatively short dwell time in the mold.

BACKGROUND OF THE INVENTION

As is known, formed bodies based on expanded styrene polymers are obtainable by molding, in closed and not gas-tight molds, polymer particles containing gaseous or liquid expanding agents, by operating at a temperature higher than the boiling point of the expanding agent and higher than the softening point of the polymeric material.

According to a usually followed operative mode, the polymer particles containing the expanding agent are first heated (pre-expansion) in a mold, either closed or open, up to a prefixed apparent density and then, after a proper ageing time (about 24 hours), are further expanded by means of heat (molding) in a gas-untight and pressure-resisting mold.

As a consequence of such heating, the particles sinter, owing to the narrow space available, thus forming a body having the shape and the dimensions of the cavity of the utilized mold.

After molding, the formed body is allowed to cool in the mold for a period of time which is long enough to limit the deformation of the formed body once withdrawn from the mold.

As the expanded plastic material is an excellent heat insulating material, relatively long dwell times in the mold are requied for cooling the formed body.

Furthermore, the expandable styrene polymers which contain a self-extinguishing organic halogen-containing compound exhibit a high shrinkage of the molded articles, what prevents from obtaining molded bodies with pre-established dimensions. A further disadvantage of these polymers resides in the fact of a high loss of expanding agent during the pre-expansion operation, so that the obtained molded bodies exhibit a low sintering degree due to the low concentration of the residual expanding agent and, consequently, to the low molding pressure.

Furthermore, the expanded particles have a cellular structure with very fine cells abd the cells' walls are perforated or open, thus not permitting the attainment of high pressure during molding.

In U.S. Pat. No. 4,029,614, there is disclosed expandable styrene polymers, containing a foaming agent, a self-extinguishing organic halogen-containing compound and from 0.0001 to 1% by weight of the styrene polymer, of an amine free from oxy-alkylated groups and having a general formula $NR_1R_2R_3$, wherein $R_1$ is an aliphatic or a cycloaliphatic hydrocarbon radical of from 4 to 20 carbon atoms and $R_2$ is hydrogen or an aliphatic or a cycloaliphatic hydrocarbon radical of from 1 to 15 carbon atoms and $R_3$ is hydrogen or an aliphatic or aromatic hydrocarbon radical of from 1 to 15 carbon atoms, with the prevision, that when both $R_2$ and $R_3$ are hydrogen, then $R_1$ has 6 to 20 carbon atoms.

In U.S. Pat. No. 4,192,922 there is disclosed foamable particles of a styrene polymer containing an expanding agent, a flameproofing organic halogen compound and from 0.0001 to 0.1 by weight, relative to the polymer, of a 2,4-diamino-1,3,5-triazine derivative.

Tests carried out by the Applicant have evidenced that none of the above-mentioned compounds gives entirely satisfactory results, particularly as regards sintering and shrinkage of the manufactured articles.

SUMMARY OF THE INVENTION

According to the present invention, it has been surprisingly found that styrene polymers, containing an expanding agent and made self-extinguishing by adding a conventional self-extinguishing organic halogen-containing compound, exhibit low shrinkages during cooling, a better sintering, a higher molding pressure, best cooling times, cellular surfaces with cells of greater diameter and with a low content of open or perforated cells' walls and with a homogeneous cellular structure, when they contain a small amount of a 2,4,6-triamino-1,3,5-triazine derivative having the general formula:

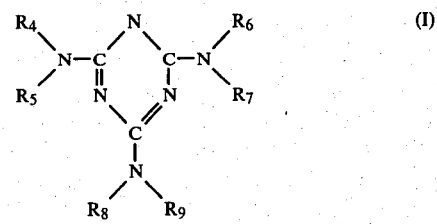

wherein at least one of the radicals $R_4$, $R_5$, $R_6$, $R_7$, $R_8$ and $R_9$ is hydrogen and each of them, independently of one another, may be: hydrogen, an alkyl radical having from 1 to 20 carbon atoms, in which, optionally, a hydrogen atom in $\omega$ position is substituted by a 2,4,6-triamino-1,3,5-triazine radical, or a cyclo-alkyl radical having from 5 to 12 carbon atoms, or an aryl radical having from 6 to 18 carbon atoms, said alkyl, cyclo-alkyl, or aryl radicals optionally containing functional groups such as halogens, hydroxyl groups, carboxyl groups and esters.

The present invention provides therefore particles of styrene homo- and copolymers containing an expanding agent, a self-extinguishing organic halogen-containing compound and in addition from 0.0001 to 0.1% by weight, referred to the polymer, of a 2,4,6-triamino-1,3,5-triazine derivative having the above-reported general formula (I).

The expandable particles of the present invention may be prepared by polymerizing, preferably according to the aqueous suspension process, the styrene, either alone or in admixture with one or more comonomers copolymerizable with it, in the presence of a self-extinguishing organic halogen-containing compound and of an expanding agent, by means of a known free radical initiator, at a temperature higher than 80° C. and by adding, before or during polymerization, a 2,4,6-triamino-1,3,5-triazine derivative having the above-indicated general formula (I).

More particularly, said derivative of 2,4,6-triamino-1,3,5-triazine, whose amount is preferably lower than the one of the halogenated organic compound, may be added either to the organic phase, or to the aqueous phase, or to the reaction mixture before or during polymerization.

The most suitable amount of 2,4,6-triamino-1,3,5-triazine derivative to be added in each individual case depends on the amount and type of halogenated organic compound added to the polymer as well as on the temperature profile used during polymerization and can be easily determined by means of simple tests.

Polymerization, addition of the expanding agent, preexpansion of the expandable particles, ageing and transformation of the pre-expanded and aged particles into formed bodies are accomplished according to techniques well known to those skilled in the art and exhaustively described, for example, in "Rigid Plastic Foams" by T. N. Ferrigno, Reinhold Publishing Corp., New York, USA (1963).

For stabilizing the suspension, the usual inorganic suspension agents, such as tricalcium phosphate, barium sulphate, zinc oxide, and the like, or the protecting organic colloids, such as poly-N.methyl-N-vinyl-acetamide, polyvinyl-alcohol, methyl-cellulose, polyvinyl-pyrrolidone, and the like may be used. The obtained polystyrol particles are subjected to drying at a temperature of from 10° to 50° C. for a time comprised between 30 minutes and 20 hours.

In the present description and in the appended claims, "styrene polymers" means both the homopolymers of styrene and the copolymers of styrene with other vinyl and/or vinylidene monomers, containing at least 50% by weight of chemically combined styrene.

Examples of comonomers to be used are alpha-methyl-styrene; nucleus-halogenated styrenes, such as 2,4-dichloro-styrene; acrylonitrile; methacrylonitrile; esters of alpha-beta-unsaturated carboxylic acids with alcohols having from 1 to 8 carbon atoms, such as acrylic and/or methacrylic esters; N-vinyl compounds, such as vinyl carbazole, etc. Belonging to the class of the styrene copolymers are also the copolymers containing, besides styrol and, may be, the vinyl and/or vinylidene comonomers mentioned hereinbefore, also small amounts of monomers containing two double bonds, such as, for example, divinylbenzene.

The expandable polystyrene particles of the present invention, contain, as expanding agents, the usual gaseous or liquid organic compounds which do not dissolve the polymer, but expand it, and whose boiling point is lower than the polymer softening point. Some examples of particularly suitable expanding agents are the aliphatic hydrocarbons, either alone or in admixture with one another, having from 2 to 6 carbon atoms such as propane, butane, n-pentane, iso-pentane, hexane, cyclohexane, and like; furthermore, the halogenated aliphatic hydrocarbons having from 1 to 3 carbon atoms, such as the various chloro- and fluoro-derivatives of methane, of ethane and of ethylene, such as di-chloro-di-fluoro-methane, 1,2,2-trifluoro-1,1,2-trichloro-ethane, and the like.

The expanding agent is used in an amount ranging from 3 to 15% preferably from 5 to 9% by weight in respect to the polymer.

Examples of self-extinguishing organic halogen-containing compounds which may be used in the styrene polymers of the present invention are: entirely or partially brominated oligomers of butadiene or of isoprene having an average polymerization degree between 2 and 20, such as e.g. brominated 1-vinyl-cyclohex-3-ene, brominated cyclo-octa-1,5-diene, brominated cyclododecyl-1,5,9-triene, brominated polybutadiene having a polymerization degree between 3 and 15, etc.

Likewise efficacious are the halogenated compounds belonging to other classes of substances such as: brominated phosphoric esters, such as tri-(2,3-dibromo-propyl)-phosphate; alkyl-phenyl-esters brominated at the nucleus, such as penta-bromo-phenyl-alkyl-ether; penta-bromo-mono-chloro-cyclo-hexane or other cyclohexanes containing at least 3 bromine atoms.

The self-extinguishing organic halogen-containing compounds are contained in the expandable styrene polymer in an amount ranging from 0.4 to 3% by weight in respect of the polymer.

In addition to the halogenated compounds the well-known synergistic agents, may be used, in usual amounts, preferably organic peroxides such as di-t.butyl-peroxide, di-cumyl-peroxide, etc.

Examples of 2,4,6-triamino-1,3,5-triazine derivatives which may be used according to this invention are:
N-phenyl-2,4,6-triamino-1,3,5-triazine;
N-dodecyl-2,4,6-triamino-1,3,5-triazine;
N-octadecyl-2,4,6-triamino-1,3,5-triazine;
N,N'-di-phenyl-2,4,6-triamino-1,3,5-triazine;
N,N',N''-tri-phenyl-2,4,6-triamino-1,3,5-triazine;
N-cyclohexyl-2,4,6-triamino-1,3,5-triazine;
1,6-di-(2,4,6-triamino-1,3,5-triazine)hexane.

Mixtures of the above-listed compounds can be used too.

In addition to the above-mentioned compounds and agents, the styrene expandable particles of the present invention may contain other additives in the usual amounts such as plasticizers, stabilizers, dyestuffs, antistatic agents, antilumping agents to avoid crumbs in the pre-expansion operation.

The following examples are given to better illustrate the inventive concept of the present invention and to facilitate the practice thereof, but are not indended to be a limitation thereof.

EXAMPLES 1 to 7

In a stainless steel 100-liter reactor, previously purged with nitrogen, a series of polymerization in aqueous suspension of mixtures having the composition given hereinbelow was carried out:

| | |
|---|---|
| deionized water | 35 Kg |
| tricalcium phosphate | 30 g |
| 0.1 N sodium hydrate | 18 cc |
| styrene monomer | 35 Kg |
| di-benzoyl-peroxide | 143.5 g |
| ter.butyl-perbenzoate | 52.5 g |
| di-cumyl-peroxide | 70 g |
| 1,2,5,6,9,10-hexabromo-cyclododecane | 210 g |
| sodium metabisulphite | 0.56 g | a compound of the type and in the amount specified in the following table.

Polymerization was carried out at temperatures varying from 85° to 120° C. for a total time of 15 hours. In the course of polymerization, 3.1 Kg, referred to the monomer, of an expanding agent consisting of a mixture of n-pentane and iso-pentane (ratio by weight = 70/30) were added. After cooling to room temperature, filtering, washing with water and drying, the polymer was screened so as to obtain expandable polystyrene particles having diameters between 0.9 and 1.6 mm. Said particles contained about 6% by weight of expanding agent. The expandible particles so obtained were fed to a pre-expander in which they were pre-expanded with steam at 95°–100° C. for about 5 minutes. The pre-expanded particles were allowed to age in air at room temperature for about 24 hours. The pre-expanded and aged particles were charged into a press for blocks till filling the mold having sizes of 100×100×50 cm. Molding was accomplished by means of steam at 0.65 Ate gauge. The cooling time of the blocks was determined. The term "cooling time" means the time required to allow the pressure in the interior of the blocks to decrease to zero after conclusion of the steam treatment.

Shrinkage and sintering degree were determined on the blocks 48 hours after molding.

Both these characteristics were evaluated on a 2 cm high plate, obtained by hot slinging from the central portion of the block. Shrinkage was determined on the basis of the difference in length and in which of the plate in respect of the corresponding sizes of the mold.

Sintering (S) is given by the percentage of expanded particles which broke as a consequence of the breaking of the plate and was determined on the basis of the following equation:

$$S\% = \frac{L \cdot a + (50 - L) \cdot b}{100} \cdot 2$$

wherein:

L is the length of the sections exhibiting a sintering $\geq 70\%$, a is the average percentage of broken particles in section L, and b is the average percentage of broken particles in section (50-L) having a sintering <70%.

The characteristics of the molded blocks prepared from the expandable particles containing the various components are recorded on the following table.

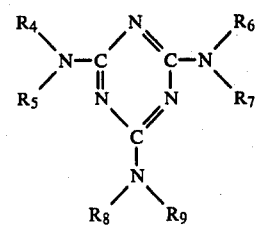

wherein at least one of radicals $R_4$, $R_5$, $R_6$, $R_7$, $R_8$ and $R_9$ is hydrogen and each of them, independently of one another, may be: hydrogen; an alkyl radical having from 1 to 20 carbon atoms in which, optionally, a hydrogen atom in $\omega$ position may be substituted by a 2,4,6-triamino-1,3,5-triazine radical; a cyclo-alkyl radical having from 5 to 12 carbon atoms or an aryl radical having from 6 to 18 carbon atoms, said alkyl-, cyclo-alkyl- or aryl-radicals optionally containing functional groups such as halogens, hydroxyl groups, carboxylic groups and esters.

2. Polystyrene particles according to claim 1, in which the content of expanding agent ranges from 3 to 15%.

3. Polystyrene particles according to claim 2, in which the content of expanding agent ranges from 5 to 9% by weight in respect to the polymer.

4. Polystyrene particles according to claim 1, in which the content of self-extinguishing organic halogen-containing compound ranges from 0.4 to 3% by weight in respect to the polymer.

5. Polystyrene particles according to claim 1, wherein a synergistic agent of the self-extinguishing organic compound is used.

6. A process for preparing expandable particles as claimed in claim 1, consisting in polymerizing, prefera-

TABLE

| Example No. | Added compound Type | % by weight referred to the monomer | Maximum pressure in the mold in Ate | Cooling time in minutes | Block density after 48 hours Kg/cm³ | Sintering % | Shrinkage % o |
|---|---|---|---|---|---|---|---|
| 1 | — | — | 0.70 | 2 | 14.9 | 50 | 56 |
| 2 | 2,4-diamino-6-phenyl-1,3,5-triazine | 0.004 | 0.85 | 8 | 14.4 | 50 | 37 |
| 3 | n-dodecylamine | 0.004 | 0.79 | 4.5 | 15.5 | 50 | 45 |
| 4 | N—phenyl-2,4,6-triamino-1,3,5-triazine | 0.004 | 0.91 | 16 | 15.5 | 60 | 15 |
| 5 | N—octadecyl-2,4,6-triamino-1,3,5-triazine | 0.004 | 1.08 | 24 | 14.4 | 65 | 0 |
| 6 | N—octadecyl-2,4-6-triamino 1,3,5-triazine | 0.008 | 1.04 | 27 | 15.6 | 60 | 5 |
| 7 | N—octadecyl-2,4,6-triamino-1,3,5-triazine | 0.002 | 0.97 | 23 | 15.5 | 60 | 10 |

What we claim is:

1. Self-extinguishing expandable polystyrene particles containing an expanding agent, a self-extinguishing organic halogen-containing compound and from 0.0001 to 0.1% by weight, referred to the polymer, of a 2,4,6-triamino-1,3,5-triazine derivative having the general formula:

bly in an aqueous suspension, the styrene either alone or in admixture with one or more comonomers copolymerizable with said styrene, in the presence of a self-extinguishing organic halogen-containing compound and of an expanding agent, by means of a free radical initiator and at a temperature higher than 80° C., and in adding, prior to or during polymerization, a 2,4,6-triamino-1,3,5-triazine derivative having general formula (I) indicated hereinbefore.

* * * * *